United States Patent [19]

Basili

[11] Patent Number: 4,736,861

[45] Date of Patent: Apr. 12, 1988

[54] REEL CARRIER WITH SLIP RESISTANT FEET

[75] Inventor: Robert A. Basili, Waldwick, N.J.

[73] Assignee: Plastic Reel Corp. of America, Elmwood Park, N.J.

[21] Appl. No.: 373,414

[22] Filed: Apr. 29, 1982

[51] Int. Cl.⁴ .................. B65D 21/02; B65D 25/24; B65D 25/26

[52] U.S. Cl. .................. 220/69; 206/404; 206/509; 206/511; 248/346; 248/359.1; 525/98

[58] Field of Search .............. 206/508, 509, 511, 512, 206/404; 220/69; 248/346, 359.1; 525/98

[56] References Cited

U.S. PATENT DOCUMENTS

| | | | |
|---|---|---|---|
| 1,779,147 | 10/1930 | Richardson | 220/69 |
| 2,578,238 | 11/1951 | Goldman | 206/508 |
| 2,578,644 | 11/1951 | Mautner | 206/511 |
| 3,297,153 | 1/1967 | Fattori | . |
| 3,307,689 | 3/1967 | Lyman | . |
| 3,911,051 | 10/1975 | Schouten | 525/98 |
| 4,109,789 | 8/1978 | Fattori et al. | . |

FOREIGN PATENT DOCUMENTS

| | | | |
|---|---|---|---|
| 2721129 | 11/1978 | Fed. Rep. of Germany | 206/512 |
| 6022 | of 1891 | United Kingdom | 220/69 |
| 839217 | 6/1960 | United Kingdom | 206/512 |

Primary Examiner—George E. Lowrance
Attorney, Agent, or Firm—Anthony J. Casella; Gerald E. Hespos

[57] ABSTRACT

Substantially slip and skid resistant reel carriers are disclosed for storing, carrying and shipping reels of motion picture film, videotape, magnetic tape and the like. The reel carriers include a plurality of tapered cylindrical bumpers or feet formed of a material having a high coefficient of friction which are adhered to the external surfaces of the top and bottom walls of the reel carrier. In preferred embodiment the bumpers are formed of a polypropylene-butaliene copolymer and are riveted to the reel carrier. The reel carriers exhibit satisfactory functional affinity for conveyor belts and are well suited for shipping and handling by contemporary automated shipping equipment.

6 Claims, 1 Drawing Sheet

REEL CARRIER WITH SLIP RESISTANT FEET

BACKGROUND OF THE INVENTION

The present invention relates to containers for storing, carrying and shipping reels of motion picture film, videotape, magnetic tape and the like. More particularly, the invention relates to reel carriers having bumpers or feet mounted thereon, made of a slip and skid resistant material.

Containers molded of high impact plastic having separable fitted covers are presently widely used for storing, carrying and shipping, by mail or otherwise, reels of motion picture film and reels of cartridges of magnetic tape, such as videotape. Two exceptional reel carriers of this type are described in U.S. Pat. No. 3,297,153 which issued to Fattori Jan. 10, 1967 and U.S. Pat. No. 4,109,789 which issued to Fattori et al. Aug. 29, 1978, each patent being assigned to the same assignee as the present invention. The disclosures of these two patents are incorporated herein by reference.

The reel carrier described in U.S. Pat. No. 3,297,153 comprises an open top box having a substantially flat bottom wall and upstanding peripheral side wall. The bottom wall is of a size and shape to receive the flat side of a reel thereon in substantially concentric relation and includes four rounded corners extending beyond the periphery of the reel. A separable fitted cover is provided having a substantially flat top wall shaped to conform to the box bottom wall and downwardly extending side wall which when in the closed position telescopingly engages the box bottom side wall. A pair of registering wells depressed inwardly from the external surfaces of the top wall and bottom wall respectively are disposed at each of the four corners. Each set of registering wells includes a pair of aligned apertures therethrough having registering diametrical enlargements. A tubular rotatable latch is provided which extends from the top well to the bottom well. The top end of the latch is provided with a radial flange having a diametrical finger grip flange extending upwardly therefrom. At the opposed lower end of the latch a diametrical set of radial projections extend outwardly from the latch and are adapted to pass through the diametrical enlargements in the apertures of the top and bottom wells. Rotation of the finger grip flange in the top well rotates the latch, and thus the radial projections at the lower end of the latch, so that they are no longer in alignment with the diametrical enlargements of the bottom well. This effectively binds the cover to the bottom box of the container for safe and protected carrying, storing and shipping of any reeled contents.

These reel carriers provide a number of distinct advantages over prior art carriers. For example, the self-contained locking means provided in the containers eliminates the need for exterior binding straps. The double thickness side wall construction and high impact strength plastic parts of the container provide a satisfactory degree of shock and stress resistance so that the containers can be air lifted substantially without damaging the container or contents. The containers are neat, attractive, easy to use and may be reused an extended number of times.

The carriers described in U.S. Pat. No. 4,109,789 provide similarly strong and shock resistant reel carriers which are provided with self-contained latch constructions having a dual capacity, namely, of locking the cover of the container to the box bottom and of connecting the locked container to a similar underlying container positioned in stacked nested relation. These cases provide a practical means for interconnecting a plurality of containers adapted to receive one reel into a single shipping unit for shipping multiple reels of related subject matter.

While the advantages of the above-described reel carriers cannot be gainsaid, it has become apparent that the containers could desirably be made more ship and skid resistant. The reel carriers tend to slip or slide on inclined surfaces. In addition, it has been observed that the containers slip when placed on conveyor belt assemblies. The coefficient of friction between the conveyor belts and the reel containers is not high enough to prevent the containers from slipping backwards on upwardly inclined belt segments or slipping at junctions of two conveyor belt segments. More particularly, because of slippage, effective transfer of the container from one belt segment to another does not always occur. Often, the reel carrier will straddle the junction between the belts and slip at both sides. The reel carrier thus remains stationery in the midst of a flow of moving packages, thereby causing jam-ups in flow which may even knock other packages off of the conveyor belts.

The magnitude of the slippage problem can be appreciated in the context of large scale automated shipping and mailing departments, such as those used in the United States Postal Service. The extremely large volume of packages which are processed makes the problem of flow stoppages, tie-ups, and spill offs even more acute because of the large numbers of other packages which will be effected. The jam-ups often require that the whole processing system be shut down so that the packages can be redistributed on the conveyor belts and normal flow resumed. Packages which fall off of the conveyor belts may often go unnoticed, resulting in serious shipping delays. In any event, the slippage of the reel carriers is costly because additional manpower is required to oversee an otherwise automated system. The United States Postal Service has found the problem so troublesome that it has issued a Postal regulation to the effect that in order for reel carriers to be shipped via U.S. mail, they must meet minimum slip and skid resistance levels.

In copending application, Ser. No. 373,415, filed concurrently herewith and now U.S. Pat. No. 4,476,990, issued Oct. 16, 1984 and assigned to the same assignee as the present invention, it is disclosed that reel carriers may be made substantially slip and skid resistant if the parts of the reel carrier are molded from a molding composition comprising from about 75% to 85% by weight high density polyethylene and from about 15% to 25% of a thermoplastic rubber, by weight of the overall composition. The thermoplastic rubber-modified polyethylene molding compositions provide the molded reel carriers with an improved coefficient of friction such that they exhibit a frictional affinity for conveyor belts and other surfaces, thereby reducing the slippage problems associated with shipping and handling of prior art reel carriers. These molded reel carriers are acceptable, however, the benefits provided by these no slip carriers can only be realized by molding new reel carrier parts.

Accordingly, it is an object of the present invention to provide slip and skid resistant properties to previously manufactured reel carriers.

It is another object of the subject invention to provide a high impact strength reel carrier which is substantially slip and skid resistant on most surfaces.

It is a further object of the subject invention to provide a reel carrier for storing, carrying and shipping reels of motion picture film capable of being conveyed by conventional automated shipping equipment which will not slip and slide to cause jam-ups in automated conveyor belt processes.

It is another object of the subject invention to provide reel carriers which are acceptable for shipment through the U.S. Mail.

It is still another object of the subject invention to provide durable, convenient and attractive reel carriers which may be reused an extended number of times.

SUMMARY OF THE INVENTION

In accordance with these and many other objects, the subject invention provides new and improved reel carriers adapted to receive reels of motion picture film, videotape, magnetic tape and the like, which are provided with a plurality of skid resistant bumpers or feet adhered to the external surfaces of the top and bottom walls of the reel carrier. The slip and skid resistant bumpers are of a generally cylindrical configuration and are firmly adhered at one end thereof to the top or bottom wall of the reel carrier and extend outwardly and perpendicularly therefrom. The opposed end of each bumper or foot is tapered or bevelled such that the diameter of the end abutting the surface of the reel carrier is larger than the opposed end. This tapering provides the bumper with added flexibility such that it may absorb many of the shearing forces which develop between moving conveyor belts and the reel carriers without breaking the frictional contact therebetween. In addition, the tapered ends of the bumpers are capable of making intimate frictional contact with irregular surfaces.

The slip and skid resistant bumpers are formed of a molded plastic material having a high coefficeint of friction. In preferred embodiments, the bumpers are made from a polypropylene-butadiene copolymer material and are adhered to the surfaces of the reel carrier by an aluminum-steel rivet.

The slip and skid resistant bumpers are adhered to the top and bottom surfaces of the reel carrier and are disposed in the general vicinity of the corners of the reel carrier. In preferred embodiments the bumpers extending from the top wall and the bumpers extending from the bottom wall are mounted in complementary locations such that when two or more of the reel carriers are horizontally stacked in top to bottom relationship, the bumpers extending downwardly from the bottom wall of the upper reel carrier will not interfere with the bumpers extending upwardly from the top wall of the lower reel carrier, thereby allowing a plurality of reel carriers to be stacked in a compact shipping unit.

The reel carriers of the subject invention are substantially slip and skid resistant on gently inclined planar surfaces. They may be moved by conventional conveyor belts substantially without slippage, and may be transferred from one belt to another. The new and improved reel carriers of the subject invention have been approved by the United States Postal Service for shipment of the carrier through the U.S. Mail.

Further objects and advantages of the subject invention will become apparent from the following detailed description of the preferred embodiment when taken in conjunction with the drawings in which:

DETAILED DESCRIPTION OF THE PREFERRED EMBODIMENT

Figure 1:
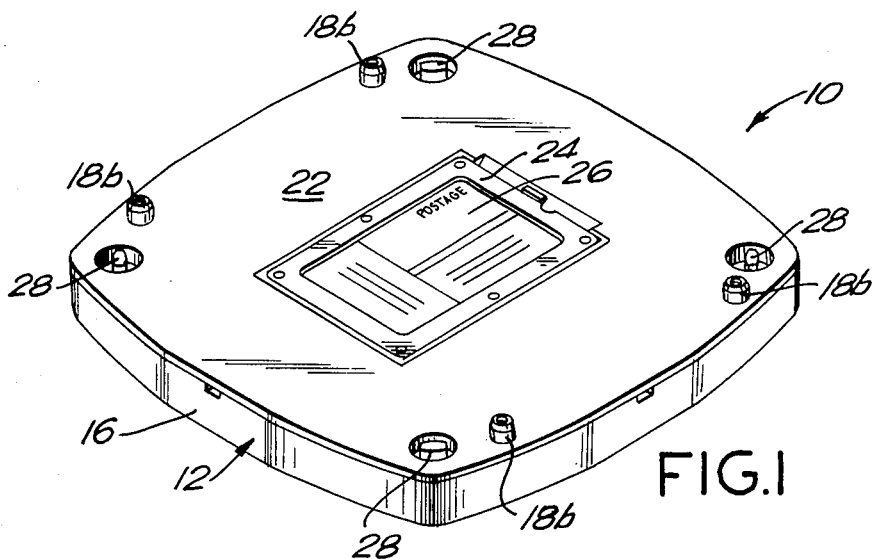
FIG. 1 is a perspective view of the new and improved slip and skid resistant reel carrier of the subject invention.
Figure 2:
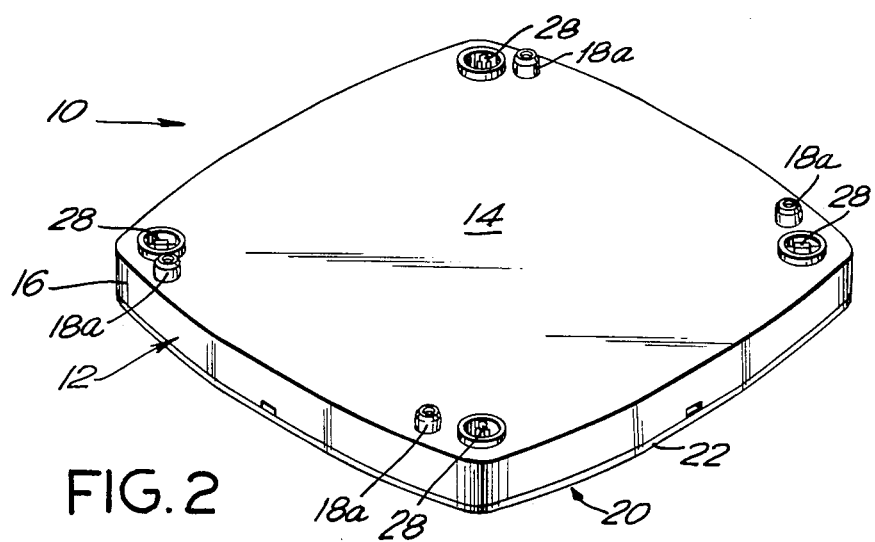
FIG. 2 is a perspective view of an inverted box bottom of the new and improved slip and skid resistant reel carrier of the subject invention.

Referring to FIG. 1, the new and improved slip and skid resistant reel carrier of the subject invention, generally referred to by the numeral 10, is shown. In the prefered embodiment depicted therein, reel carrier 10 is of the type shown and described in U.S. Pat. No. 3,297,153. Reel carrier 10 generally comprises an open top box or container portion 12 having a substantially flat bottom wall 14 and upstanding peripheral side wall 16, shown more particularly in FIG. 2. Box bottom wall 14 is sized and shaped to receive the flat side of a reel thereon in substantially concentric relation and has four rounded corners extending beyond the periphery of the reel. A plurality of substantially cylindrical bumpers or feet 18a, to be more fully described below extend perpendicularly from the exterior surface of bottom wall 14 and are disposed in the general vicinity of the corners of reel carrier 10.

Reel carrier 10 also includes a separable fitted cover 20 for open box 12 having a substantially flat top wall 22 shaped to conform to box bottom wall 14. A second plurality of bumpers 18b extend perpendicularly from the exterior surface of top wall 22 which are likewise disposed in the general vicinity of the corners thereof. Reel carrier 10 is preferrably provided with a framed window 24 embedded in top wall 22 for removably receiving a shipping label 26. Reel carrier 10 is also preferrably provided with self-contained interlocking devices 28 cooperating between cover 20 and box 12 effective to close and lock the reel carrier together.

Bumpers 18a and 18b are substantially identical and are formed from a material having a high coefficient of friction. In preferred embodiment bumpers 18a and 18b will be formed of a polypropylene-butadiene copolymer material, although other known rubbery copolymers may find application. Bumpers 18a and 18b impart slip and skid resistance to a reel carrier, such as reel carrier 10. The bumpers are of a generally cylinderical configuration and are adhered to the carrier so that they extend outwardly from the top and bottom walls thereof in such manner that the longitudinal axis of the bumper is perpendicular to the reel carrier surface from which it extends. Each bumper abuts the surface of the reel carrier at one end and in preferred embodiments each includes a bevel or taper 30 disposed in the opposed end 32 thereof, said taper 30 extending from a point 34 intermediate the length of the bumper to opposed end 32, as is more clearly shown in FIGS. 3 and 4. In the preferred embodiment depicted in FIG. 4, bumper 18b is provided with a centrally-disposed, stepped aperture 36 extending the length thereof adapted to receive an aluminum steel rivet 38 for fixedly adhering bumpers 18b to top wall 22. Rivet 38 is of a length sufficient to extend through bumper 18b and top wall 22 so that it may be secured in place by grip washer 40 disposed adjacent the interior surface of top wall 22. It is to be understood that bumper 18b may be adhered to reel carrier 10 by any other suitable method, such as by adhesive bonding.

In preferred embodiments, bumper 18b has general external dimensions of approximately ⅝ of an inch in length and has a diameter of approximately ¼ inch. The stepped central aperture 36 has a diameter for the enlarged section adapted to receive the head of rivet 38 of about 11/32 of an inch and for the narrower section adapted to receive the shaft portion of rivet 38 of about 13/64 of an inch, with the enlarged section disposed approximately ¼ of an inch from the abutting end of bumper 18b. The angle of the bevel or taper 30 in opposed end 32 is approximately 45° from intermediate point 34 to the periphery of opposed end 32 with respect to the verticle peripheral side wall of bumper 18b.

The bevel or taper 30 in bumper 18b provides additional slip and skid resistance to reel carrier 10. Firstly, it provides that the wall thickness decreases in the vicinity of the contact surface formed between the opposed end 32 of the bumper 18b and another object such as a conveyor belt. The thinner walls of tapered bumper 18b are more flexible at the contact surface than a straight non-tapered cylinderical bumper and thus tapered bumper 18b can bend and give more to absorb vibrational or mechanical shearing forces which develop between the bumper and the conveyor belt at the contact surface. The vibrational or mechanical shearing forces between the belt and the reel carrier are therefore less likely to overcome the frictional affinity of the bumper 18b for the conveyor belt. In addition, bevel or taper 30 provides a contact surface area which is less bulky than a non-tapered bumper would be. It is smaller so that it may make more intimate frictional contact with rough, ripped or grooved surfaces. More particularly, the flexible and smaller contact surface of the tapered bumper can make contact within the grooves and irregularities in the surface of a conveyor belt whereas a full thickness, stiffer non-tapered contact surface would contact only the crests formed between the surface irregularities. In other words, although the potential contact surface area of the tapered bumper would seem to be less than that of a non-tapered bumper, in actual practice it provides greater actual contact surface area through which effective frictional interaction between the reel carrier and conveyor belt can occur. The new and improved reel carriers of the subject invention equipped with the slip and skid resistant bumpers require larger forces to overcome their frictional affinity for the surfaces of other articles and exhibit substantial slip and skid resistance when they are processed and handled with contemporary automated mailing and shipping equipment.

Figure 3:
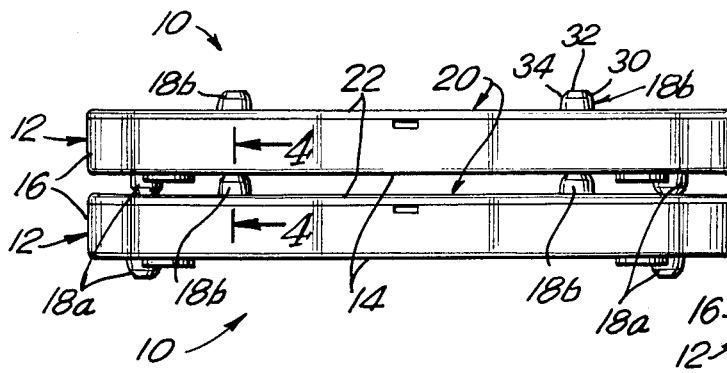
FIG. 3 is an elevational view of two of the new and improved slip and skid resistant reel carriers of the subject invention in horizontally stacked relation.
Figure 4:
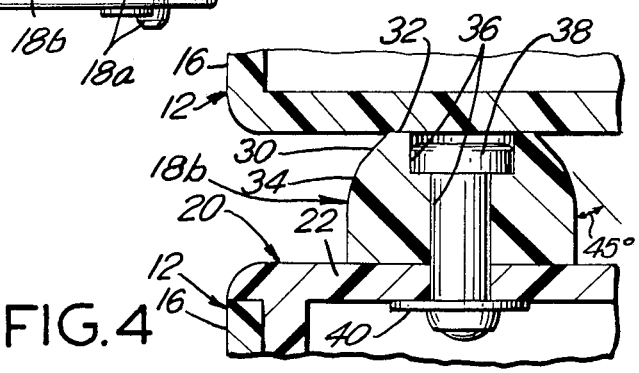
FIG. 4 is a magnified, elevated cross sectional view of two of the new and improved slip and skid resistant reel carriers of the subject invention in horizontally stacked relation taken along line 4—4 from FIG. 3.

In the preferred embodiment depicted in FIGS. 1–4, bumpers 18a and 18b are disposed in complementary locations on the bottom wall 14 and top wall 20 respectively in the vicinity of the corners of reel carrier 10. More particularly if a bumper 18a is located adjacent one side wall of one corner of reel carrier 10, the complementary top wall bumper 18b in the vicinity of that particular corner will be located adjacent the other side wall. This complementary positioning of the top and bottom wall bumpers provides that when two or more reel carriers 10 are horizontally stacked in top to bottom relationship, the downwardly extending bumpers 18a of the upper reel carrier will not interfere with the upwardly extending bumpers 18b of the lower reel carrier as shown in FIG. 3. Two or more reel carriers may thus be stacked to form a compact shipping unit and the surface contact made between the bumpers and the adjacent reel carriers help to avoid any shippage between the carriers so stacked during handling.

Although the subject invention has been described with reference to a preferred embodiment it is apparent that changes and modifications may be made therein by those skilled in the art without departing from the scope and spirit of the subject invention as defined by the appended claims.

What is claimed is:

1. A substantially slip and skid resistant container for storing, carrying and shipping reels of motion picture film, videotape, magnetic tape and the like, said container comprising:

an open top box having a substantially flat bottom wall and upstanding peripheral side wall, said box bottom wall being sized and shaped to receive the flat side of a reel thereon in substantially concentric relation and having four rounded corners extending beyond the periphery of the reel;

a separable fitted cover for said open top box having a substantially flat top wall shaped to conform to said box bottom wall;

a first plurality of bumpers formed from a polypropylene-butadiene material and having a generally cylindrical configuration adhered to and extending perpendicularly from the external surface of said box bottom wall, each said bumper being disposed in the general vicinity of a corner thereof;

a second plurality of bumpers formed from a polypropylene-butadiene material and having a generally cylindrical configuration adhered to and extending perpendicularly from the exterior surface of said top wall, each disposed in the general vicinity of a corner thereof; and means for securing said box bottom and said cover together said first and second plurality of bumpers being mounted to said container in complementary locations at each of the corners such that a first and a second of said containers may be stacked in top to bottom relationship such that said first plurality of said bumpers on said first container do not interfere with said second plurality of bumpers on said second container enabling two or more of said containers to be stacked in a compact manner, whereby said bumpers render said containers substantially slip and skid resistant.

2. A substantially slip and skid resistant container as recited in claim 1 wherein each of said first plurality of bumpers and said second plurality of bumpers further include a centrally disposed stepped aperture extending therethrough along the entire length thereof.

3. A substantially slip and skid resistant container as recited in claim 2 wherein each said bumper in said first and second pluralities of bumpers is adhered to said container by a rivet.

4. A substantially slip and skid resistant container as recited in claim 1 wherein each said bumper in said first and second pluralities of bumpers is adhered to said container with an adhesive.

5. A substantially slip and skid resistant container as recited in claim 1 wherein each of said cylindrical bumpers are bevelled or tapered from a point intermediate its length to the outwardly directed opposed end thereof.

6. A substantially slip and skid resistant container as recited in claim 5 wherein said bumpers are tapered at a 45° angle with respect to the vertical peripheral side wall of said bumper.

* * * * *